US008960722B2

(12) United States Patent
Sivinski et al.

(10) Patent No.: US 8,960,722 B2
(45) Date of Patent: Feb. 24, 2015

(54) HEAD TRAILER WITH SADDLE ACTUATOR

(71) Applicant: Harvest International, Inc., Storm Lake, IA (US)

(72) Inventors: Jeffrey A. Sivinski, Cherokee, IA (US); Garry D. Friesen, Storm Lake, IA (US); Byron J. Friesen, Storm Lake, IA (US)

(73) Assignee: Harvest International, Inc., Storm Lake, IA (US)

( * ) Notice: Subject to any disclaimer, the term of this patent is extended or adjusted under 35 U.S.C. 154(b) by 0 days.

(21) Appl. No.: 13/861,698

(22) Filed: Apr. 12, 2013

(65) Prior Publication Data
US 2014/0306424 A1 Oct. 16, 2014

(51) Int. Cl.
*B62D 63/06* (2006.01)
(52) U.S. Cl.
CPC .................................. *B62D 63/061* (2013.01)
USPC ............. 280/789; 280/781; 280/656; 410/77; 410/2; 410/4; 410/45; 56/228; 56/473.5
(58) Field of Classification Search
CPC ........... B62D 21/20; B60P 7/13; B60P 3/066; A01D 75/002
USPC .............. 280/789, 781, 656; 410/77, 2, 4, 45; 56/228, 473.5
See application file for complete search history.

(56) References Cited

U.S. PATENT DOCUMENTS

| 3,655,218 | A | * | 4/1972 | Taylor | 410/44 |
| 4,242,031 | A | * | 12/1980 | McMullen | 414/470 |
| 4,371,299 | A | | 2/1983 | Cain et al. | |
| 4,708,358 | A | * | 11/1987 | Gehman et al. | 280/402 |
| 5,011,177 | A | * | 4/1991 | Grice | 280/482 |
| 5,056,806 | A | | 10/1991 | Johnson | |
| 5,785,472 | A | | 7/1998 | Smith et al. | |
| 6,047,989 | A | * | 4/2000 | Wood | 280/789 |
| 6,428,047 | B1 | * | 8/2002 | Kaderabek | 280/789 |
| 8,517,647 | B2 | * | 8/2013 | Hilvers | 410/77 |
| 8,616,812 | B2 | * | 12/2013 | Bergen et al. | 410/44 |
| 2009/0056296 | A1 | * | 3/2009 | Patterson | 56/228 |
| 2009/0189382 | A1 | * | 7/2009 | Nubel et al. | 280/789 |
| 2011/0176882 | A1 | * | 7/2011 | Bergen et al. | 410/44 |

* cited by examiner

*Primary Examiner* — Joseph Rocca
*Assistant Examiner* — Marlon Arce
(74) *Attorney, Agent, or Firm* — McKee, Voorhees & Sease

(57) ABSTRACT

A trailer for transporting an agricultural harvesting head includes a pair of saddles for supporting the head. The saddles are adjustably mounted on the trailer frame and are simultaneously moved together by an actuator operated by a remote control. The saddles are connected by telescoping rod sections so that the spacing between the saddles is adjustable.

20 Claims, 15 Drawing Sheets

US 8,960,722 B2

HEAD TRAILER WITH SADDLE ACTUATOR

FIELD OF THE INVENTION

The invention relates to a trailer with adjustable saddles for transporting an agricultural harvesting head, such as a combine corn head or bean head.

BACKGROUND OF THE INVENTION

The size of harvesting equipment in the agricultural industry has increased for several decades. The increased width of these heads, such as a corn or bean head on a combine, makes it impractical and unsafe for the combine to drive down a road with the head mounted on the combine. Elongated trailers are often used to haul these heads down the road so that the head width is oriented in the direction of travel. When the corn or bean head is to be removed from the combine and loaded onto the trailer, the combine approaches the trailer from one side and raises the head above the trailer. Then, saddles or cradles on the trailer must be adjusted so as to match supporting structure, such as heels, on the head. In conventional trailers, this adjustment of the saddle is accomplished manually, one saddle at a time. This adjustment process is therefore time consuming. If the trailer is used for different heads, the adjustment must be made for each head.

Accordingly, a primary objective of the present invention is the provision of a saddle assembly for a head trailer which makes adjustment of the saddle position on the trailer easier and quicker.

Another objective of the present invention is the provision of a head trailer having a pair of adjustable saddles which are moved simultaneously along the trailer frame.

A further objective of the present invention is the provision of a head trailer having a pair of saddles whose position can be adjusted on the trailer from a remote location, such as the combine cab.

Another objective of the present invention is the provision of a head trailer with a pair of saddles which are interconnected for movement in unison to a desired position on the trailer frame.

Still another objective of the present invention is the provision of a method for simultaneously moving first and second saddles on a head trailer frame to align with a head on a combine.

Another objective of the present invention is the provision of an improved saddle assembly for a head trailer which is economical to manufacture, simple to install, and safe and durable in use.

These and other objectives will become apparent from the following description of the invention.

SUMMARY OF THE INVENTION

The head trailer of the present invention includes a frame, with a pair of saddles mounted on the frame. The trailer and saddles are adapted to support a harvesting head of an agricultural combine, or similar equipment. The saddles are connected and move simultaneously relative to the trailer frame. The movement of the saddles is controlled by an actuator, which can be operated by a remote control from a location apart from the frame, such as the cab of a combine. The adjustable saddles allow the head to be quickly and easily positioned on the trailer beneath the head without the need for the combine operator to precisely position the combine so that the head is accurately positioned over the saddles.

DETAILED DESCRIPTION OF THE PREFERRED EMBODIMENTS

Figure 1:
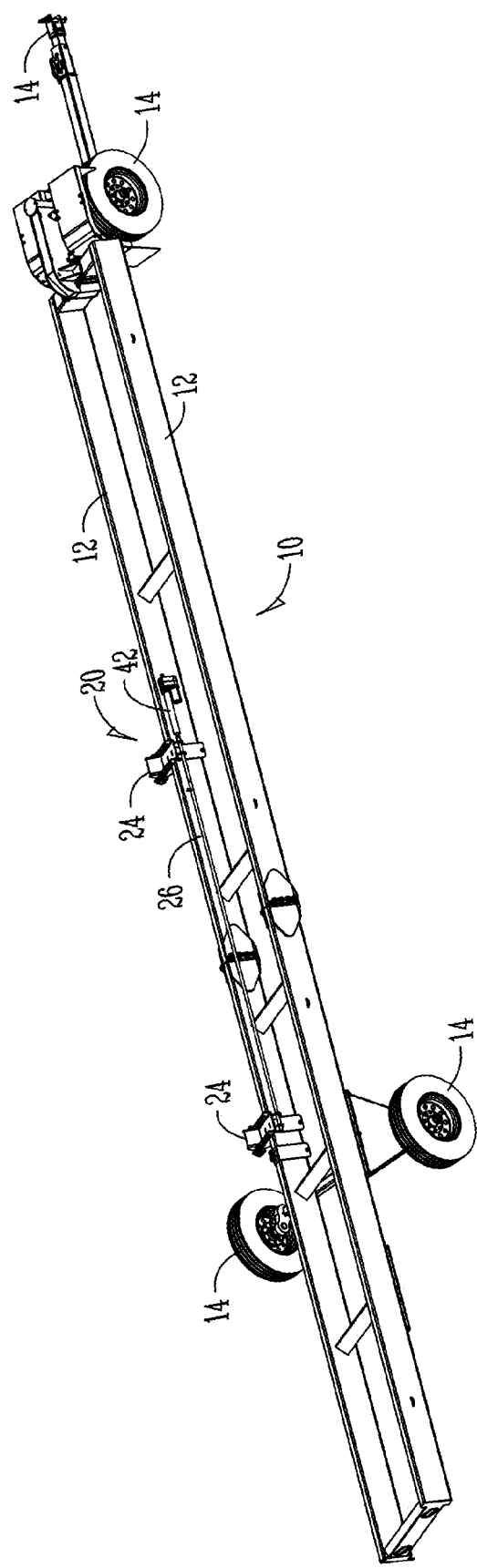
FIG. 1 is a perspective view of a head trailer with a first embodiment of the saddle assembly according to the present invention.
Figure 8:
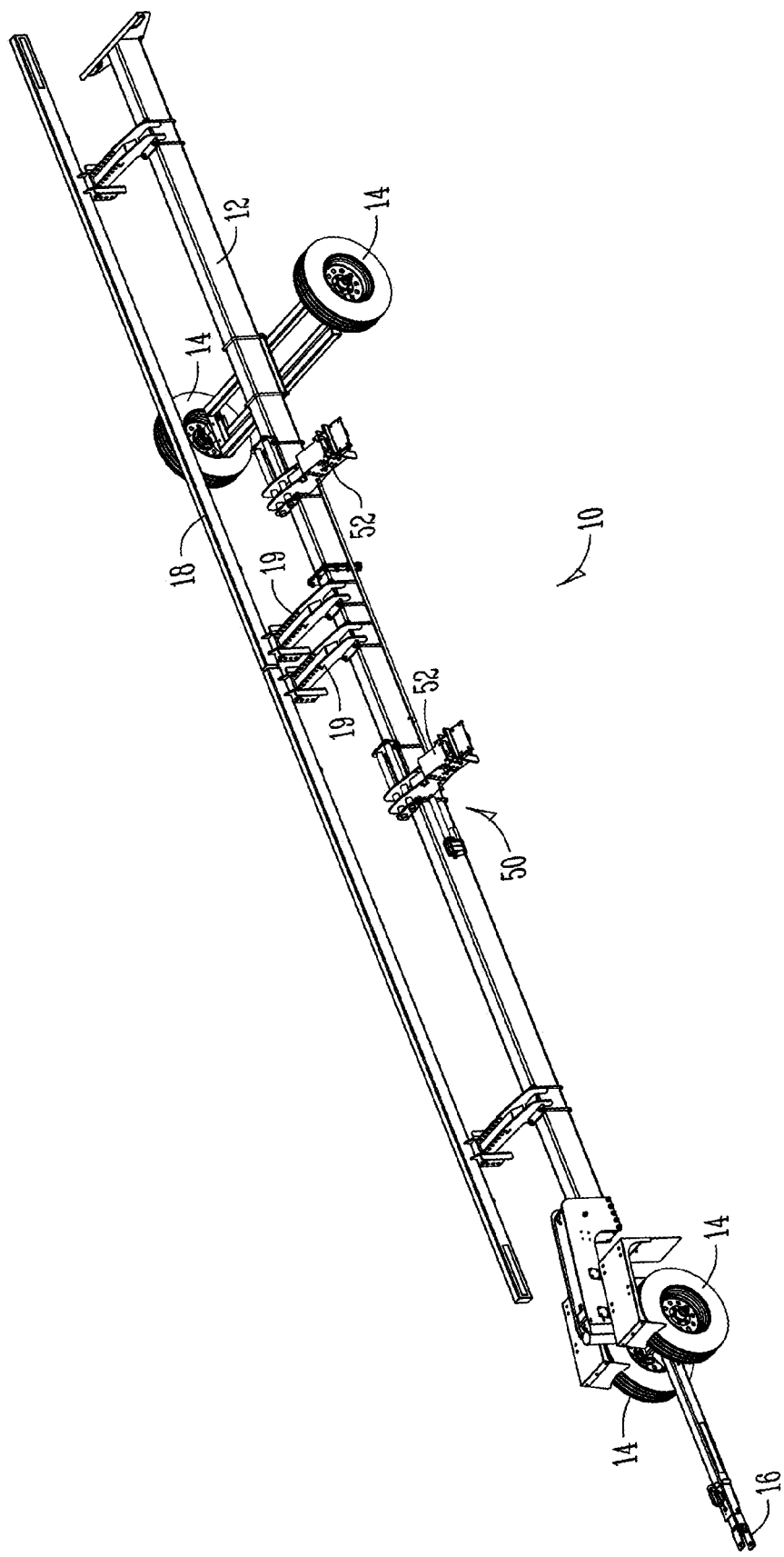
FIG. 8 is a perspective view of a head trailer with a second embodiment of a saddle assembly according to the present invention.
Figure 9:
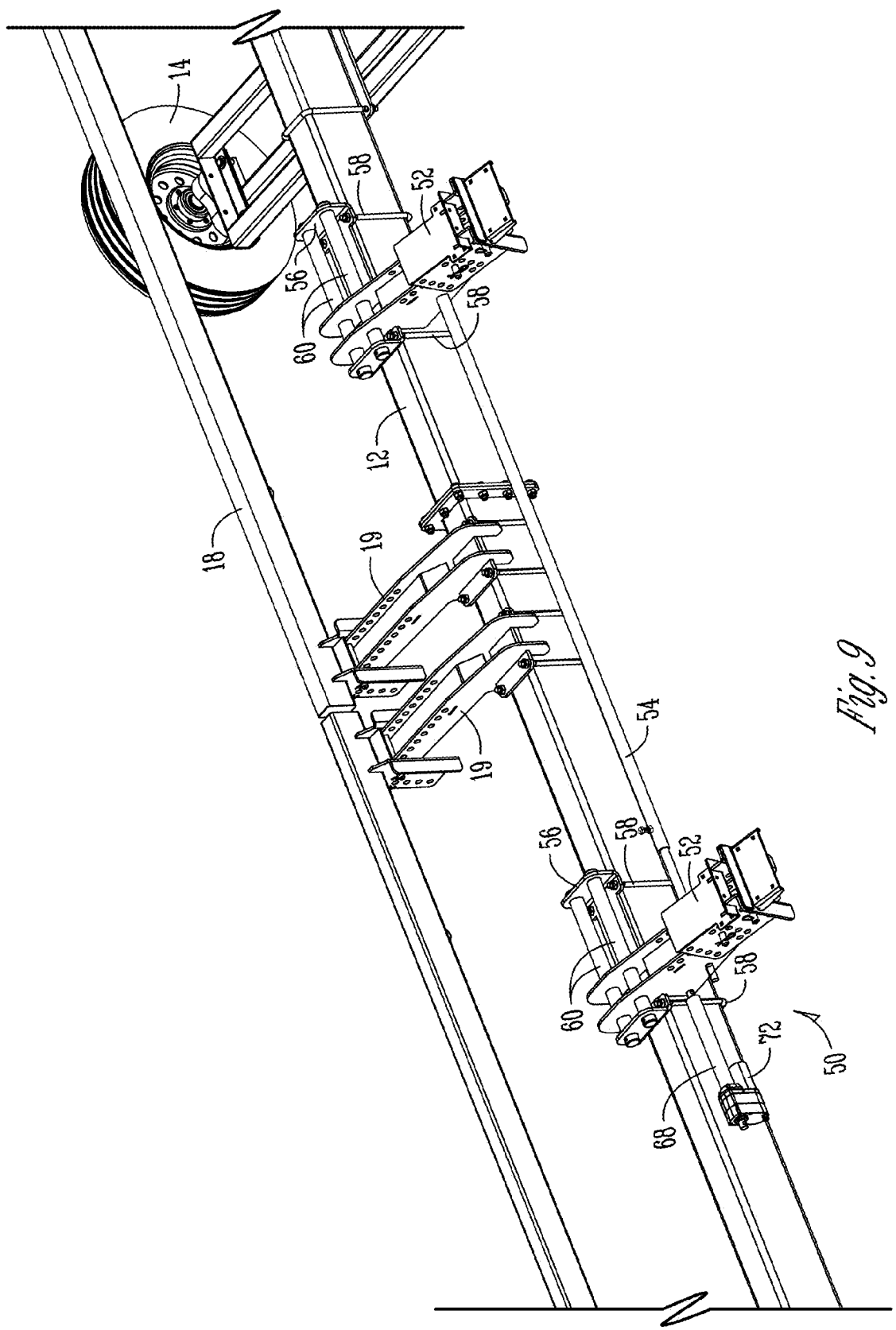
FIG. 9 is an enlarged perspective view of the saddle assembly shown in FIG. 8.

FIGS. 1 and 8 show an elongated trailer 10 used for transporting agricultural and other equipment, such as corn and bean harvesting heads. The trailer 10 includes a frame 12 with wheels 14, and a hitch 16 for connecting the trailer to a vehicle, such as a tractor or a truck. The trailer frame 12 may include dual rails, as shown in FIG. 1, or a primary rail with a secondary rail 18 supported by cantilever arms 19, as shown in FIG. 8. The structure of the trailer 10 may vary from that shown in the drawings.

Figure 2:
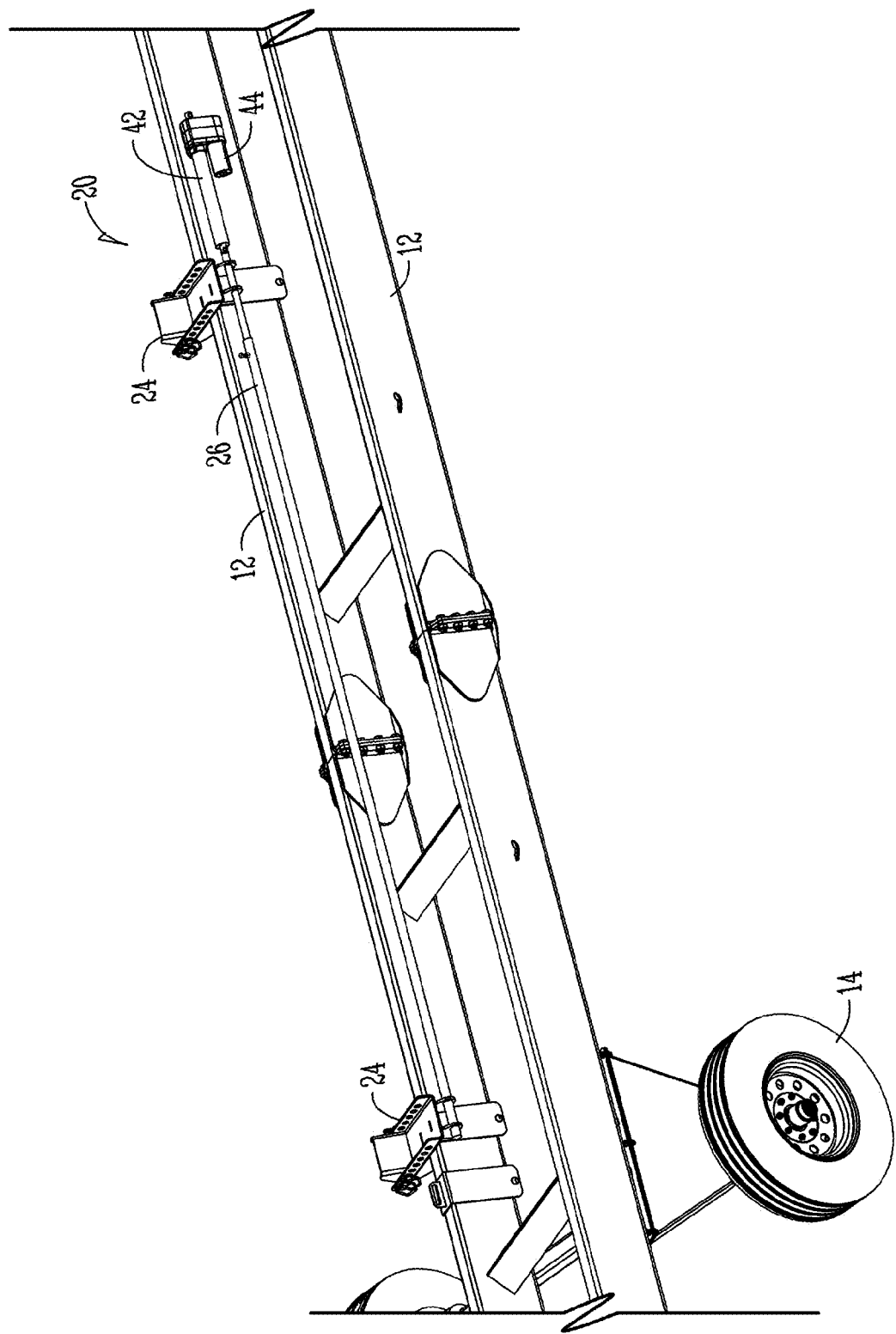
FIG. 2 is an enlarged perspective of the saddle assembly shown in FIG. 1.
Figure 3:
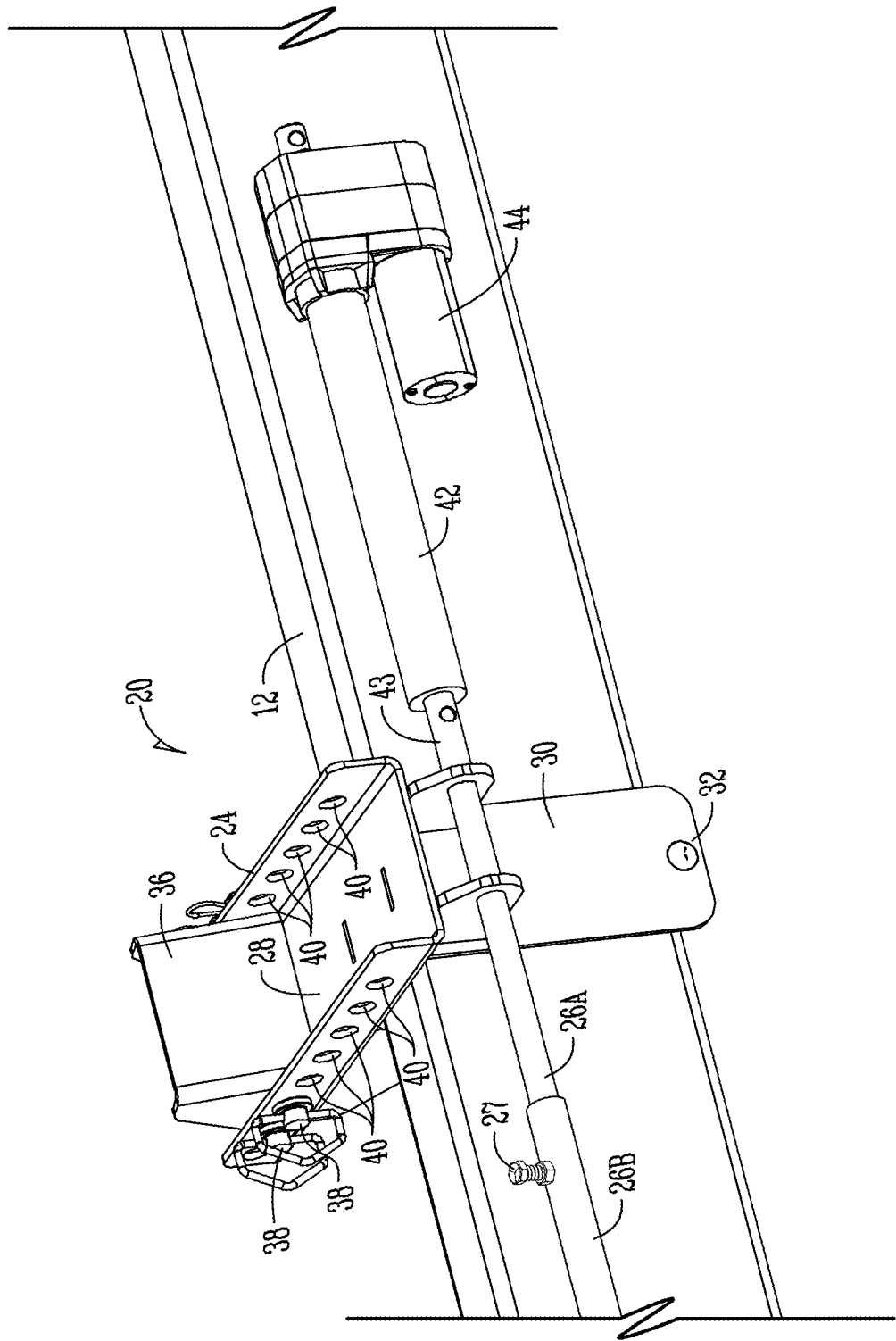
FIG. 3 is a further enlargement of one of the saddles of the assembly shown in FIG. 1.
Figure 4:
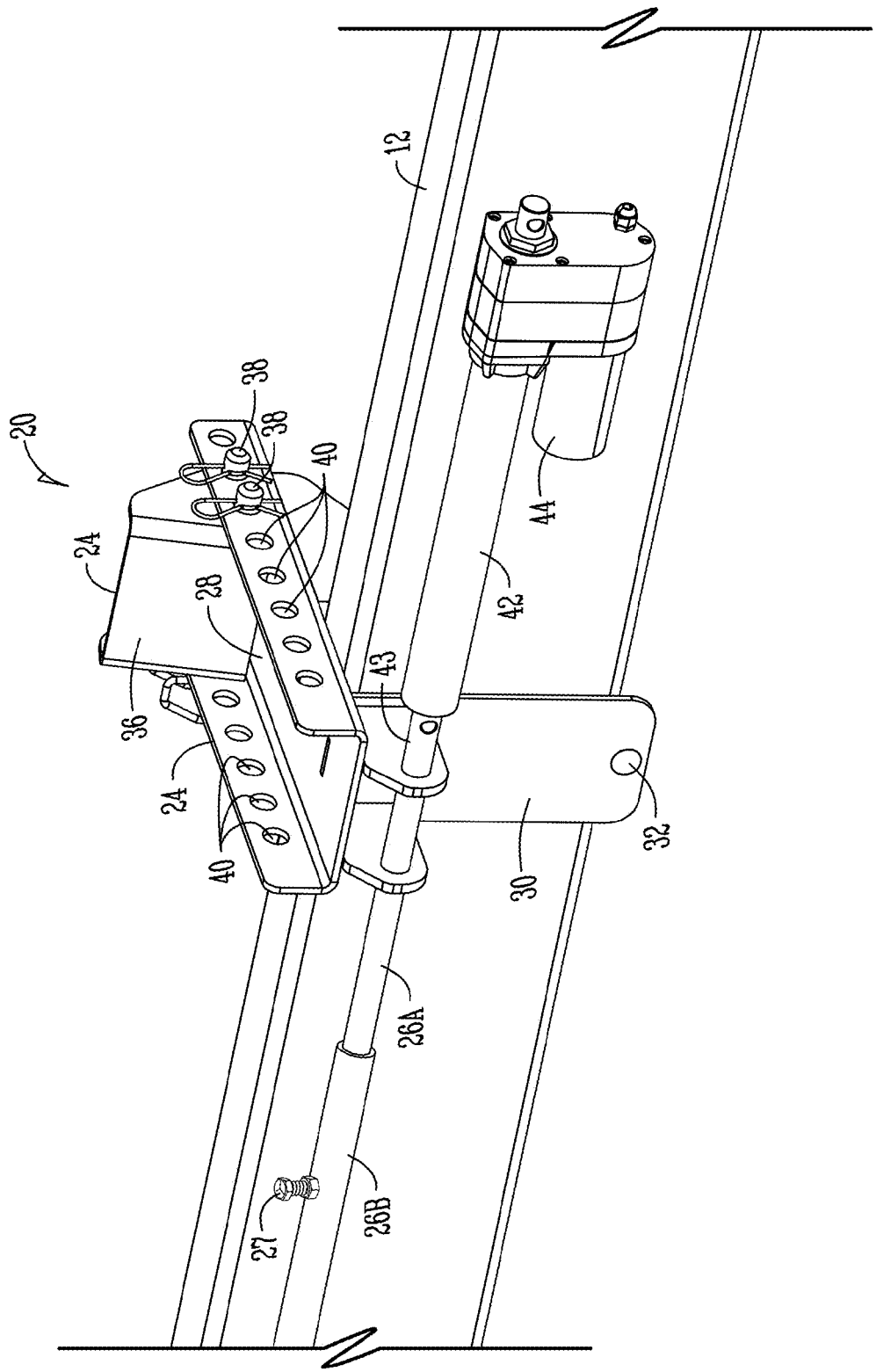
FIG. 4 is a view from a different perspective of the saddle shown in FIG. 3.
Figure 5:
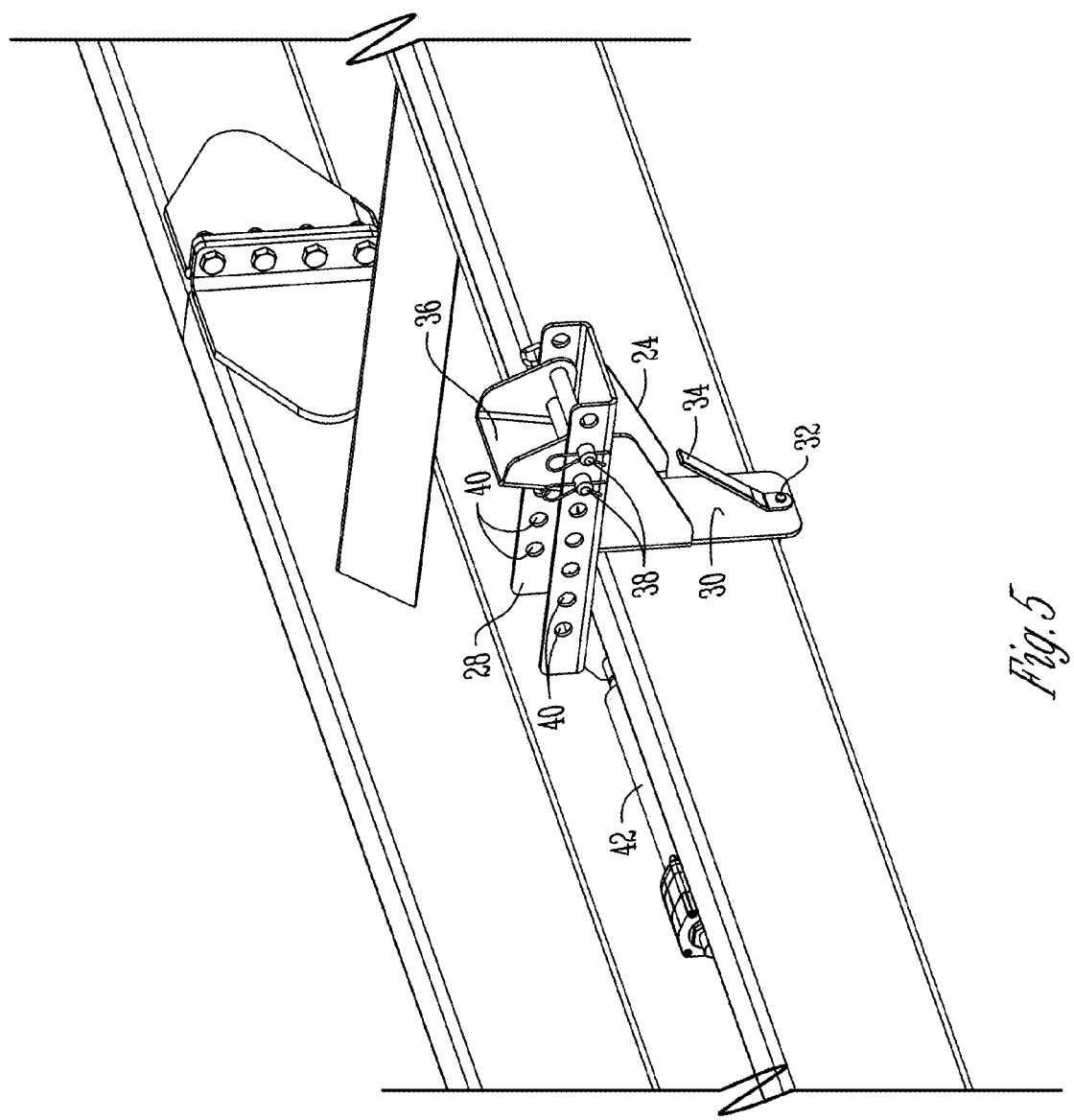
FIG. 5 is another perspective view of the saddle shown in FIG. 3.

The present invention is directed towards a saddle assembly which is mounted on the frame 12 of the trailer 10 to support a harvesting head 22 for transport. FIGS. 1-7 show a first embodiment 20 of the saddle assembly. The saddle assembly 20 includes a pair of saddles 24 which are interconnected by an elongated rod 26 or other structural member. Preferably, the rod 26 has telescoping sections 26A and B, as shown in FIGS. 2 and 3, so that the spacing between the saddles 24 is adjustable. A set screw 27 can be loosened to extend or retract the rod sections, and tightened to fix the rod sections.

Each saddle 24 includes a cradle 28 on top of a pair of legs 30. The legs 30 straddle the trailer frame 12 so that the cradle 28 resides on top of the frame 12. A bolt 32 extends through the legs 30 beneath the frame 12. Thus, the saddle 24 extends on all four sides of the frame 12 so as to be securely mounted thereto. A quick release handle or lever 34 is threadably mounted on the bolt 32 so as to clamp the legs 30 to the trailer frame 12 in a fixed position when the lever 34 is tightened.

Figure 6:
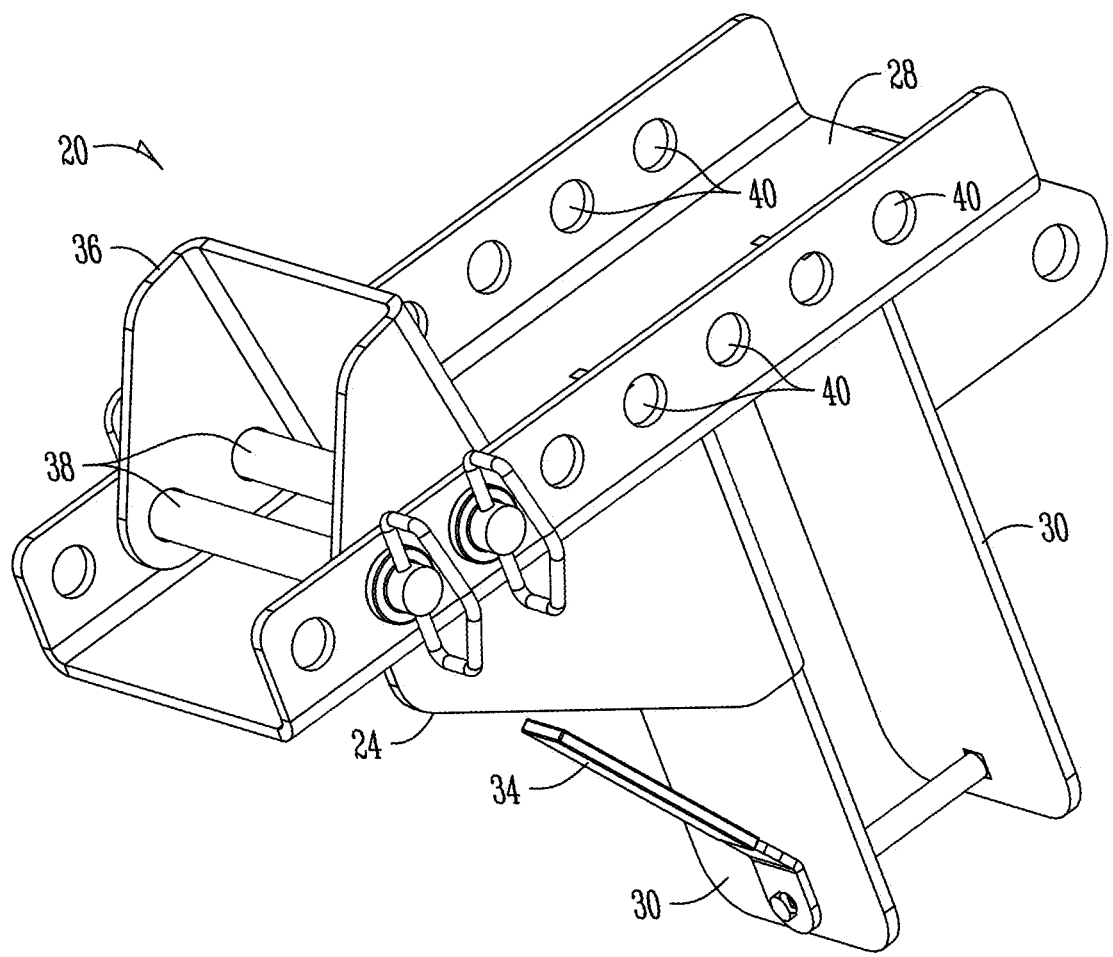
FIG. 6 is a perspective view of the saddle shown in FIG. 3, apart from the trailer frame.
Figure 7:
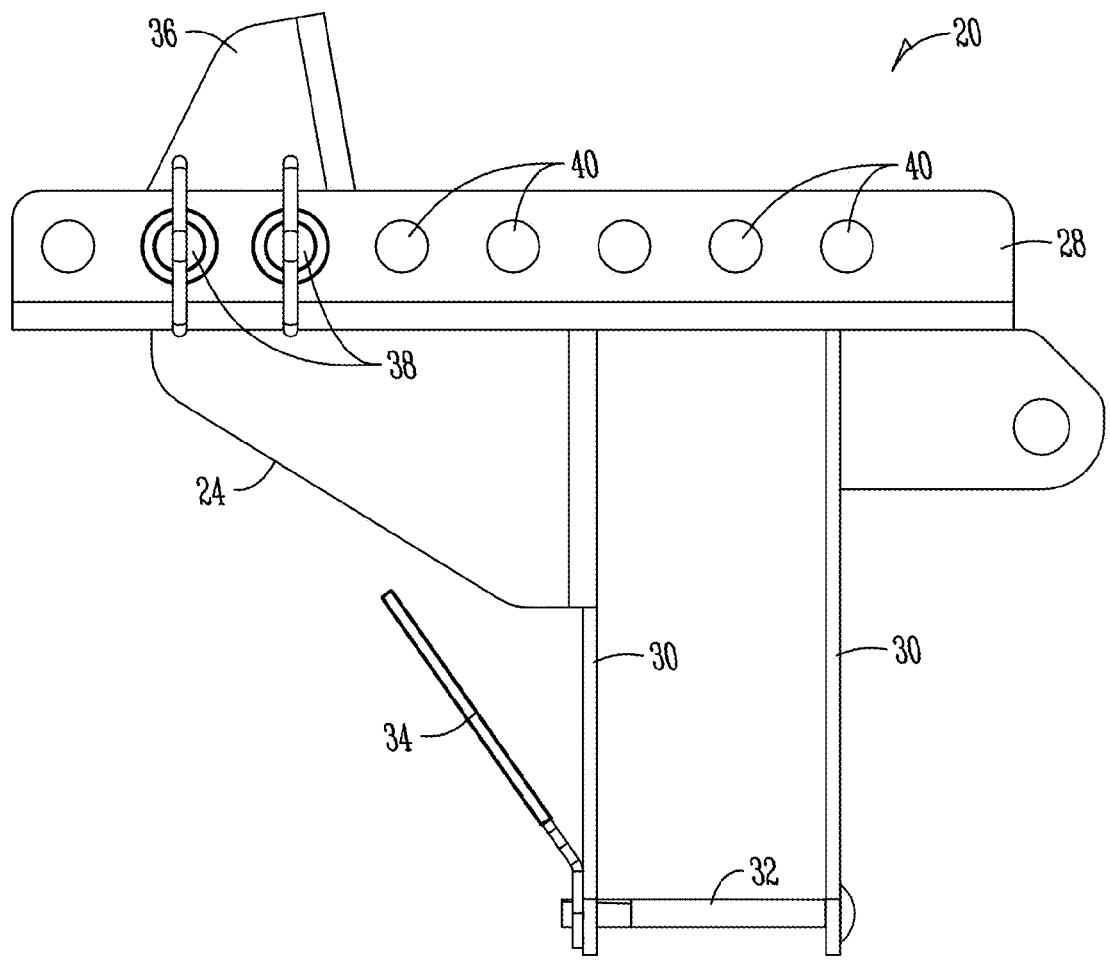
FIG. 7 is a side elevation view of the saddle shown in FIG. 6.

The cradle 28 of the saddle 24 includes a stop member 36 which can be selectively moved along the cradle 28 and pinned in a desired position via the pins 38 which extend through aligned holes 40 in the opposite sides of the cradle 28 and the stop member 36, as best seen in FIG. 6.

An actuator 42 is mounted to the trailer frame 12. The actuator 42 may be a linear actuator, a hydraulic or pneumatic cylinder, a mechanical actuator, or other similar device for moving the saddles 24. The end of the connecting rod 26 is attached to an extendable and retractable end 43 on the actuator 42. For a linear actuator, such as shown in the drawings, an electric motor 44 is operatively connected to the actuator 42. When the quick release lever 34 is loosened so as to unclamp the legs 30 from the frame 12, the motor 44 can be turned on to operate the linear actuator 42 so as to extend and retract the rod 26, and thereby move the saddles 24 forwardly or rearwardly relative to the trailer frame 12. Other types of actuators, such as hydraulic or pneumatic cylinders, are operated in convention manners to extend or retract an actuator arm connected to the rod 26 so as to move the saddles 24. For example, a pump typically controls flow of hydraulic fluid or air to and from hydraulic or pneumatic cylinders. The saddles 24 are moved simultaneously to a desired position in alignment with the heels or other support structure of the head 22. The spacing between the saddles 24 corresponds to the heels or support structure of the head 22.

FIGS. 8-14 show a second embodiment 50 of the saddle assembly according to the present invention. The saddle assembly 50 includes a pair of first and second saddles 52 which are connected by a rod 54. Preferably, the rod 54 has telescoping sections 54A and B, with a set screw 55 which allows the sections 54A and B to be extended and retracted to adjust the distance between the saddles 52 so as to match the spacing of the heels on the head. The screw 55 is tightened to fix the rod sections 54A and B at a selected length.

Figure 10:
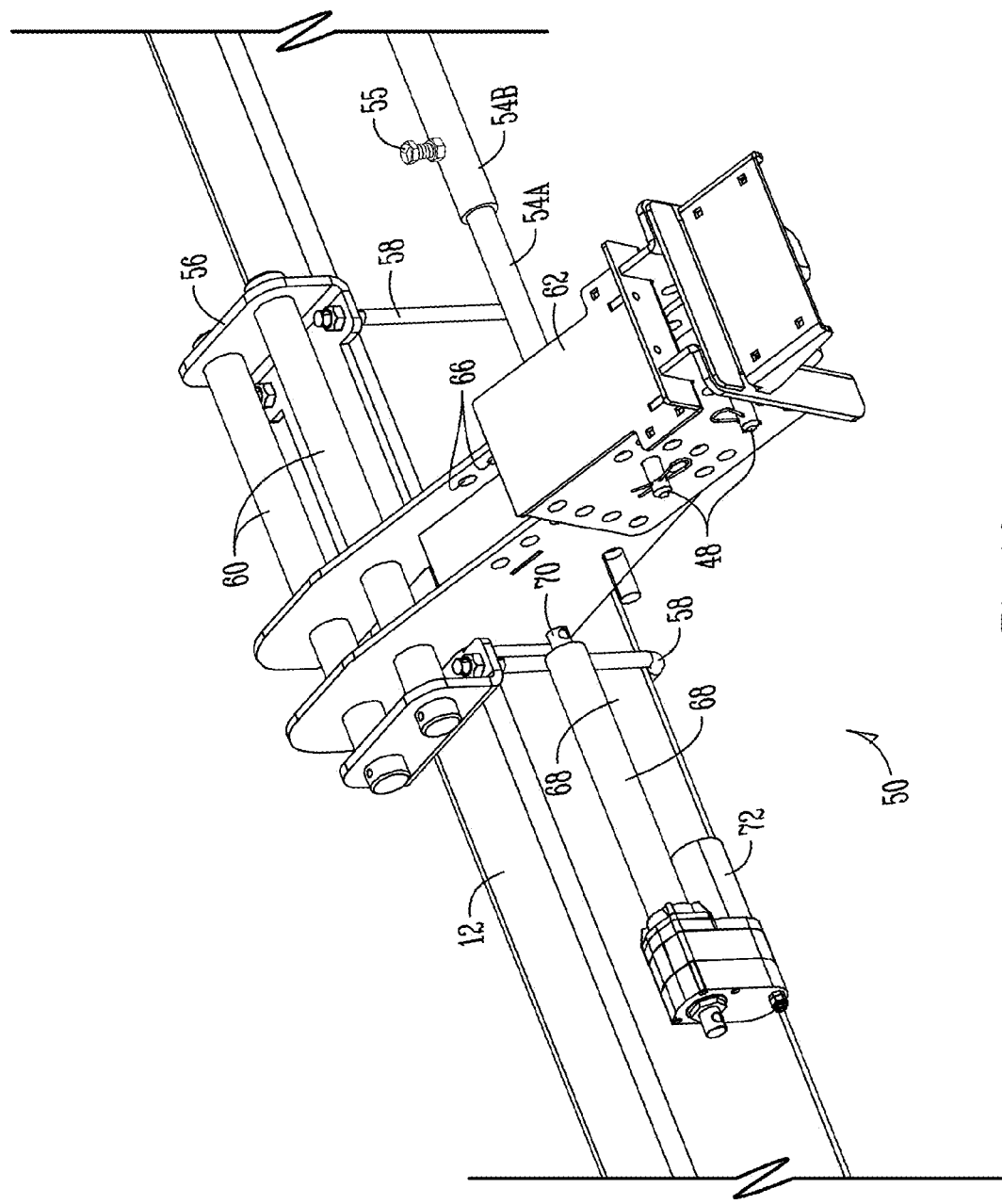
FIG. 10 is a further enlargement perspective view of one of the saddle shown in FIG. 9.
Figure 11:
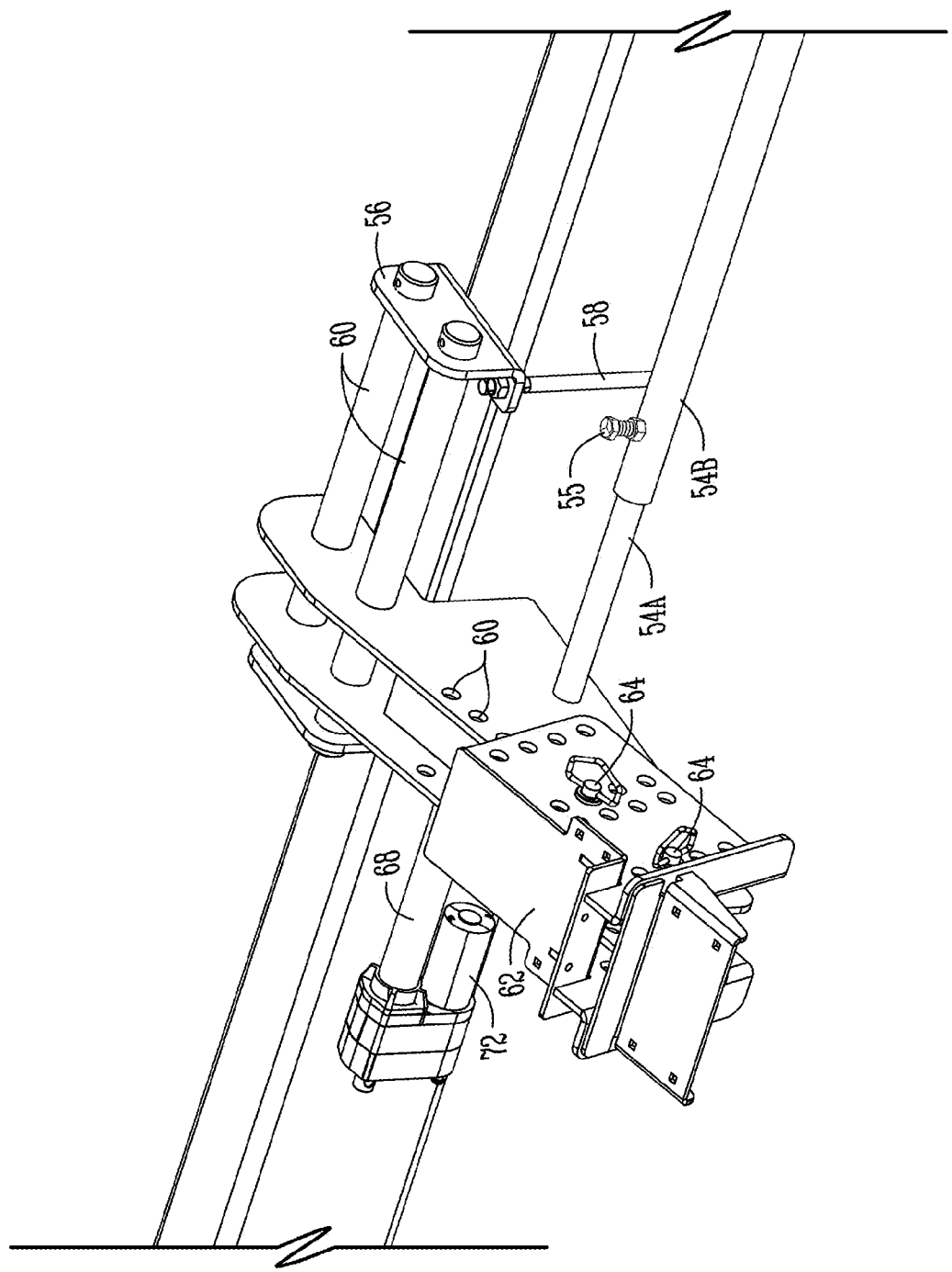
FIG. 11 is another perspective view of the saddle shown in FIG. 10.
Figure 12:
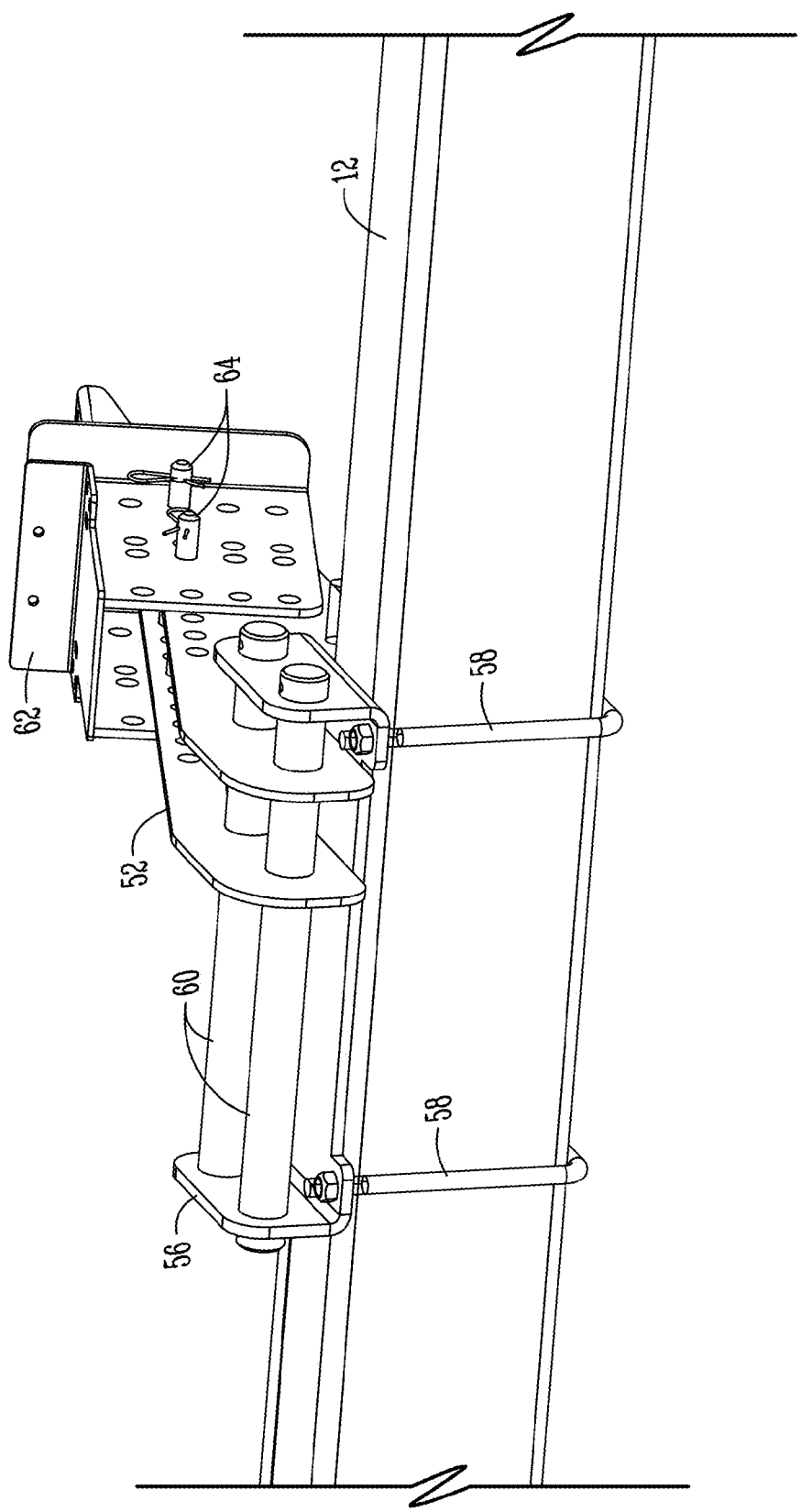
FIG. 12 is a further perspective view of the saddle shown in FIG. 10.
Figure 13:
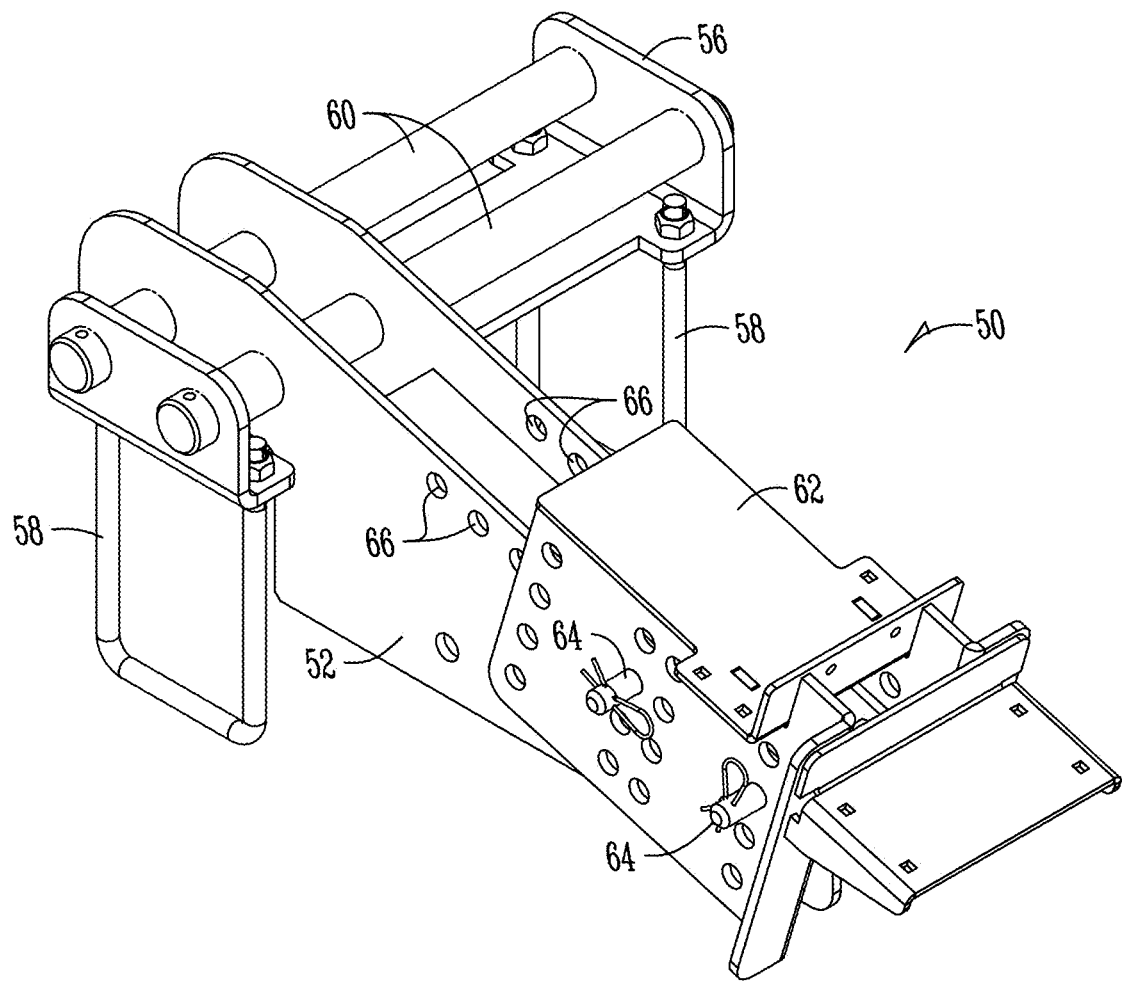
FIG. 13 is a perspective view of the second embodiment saddle, apart from the trailer frame.
Figure 14:
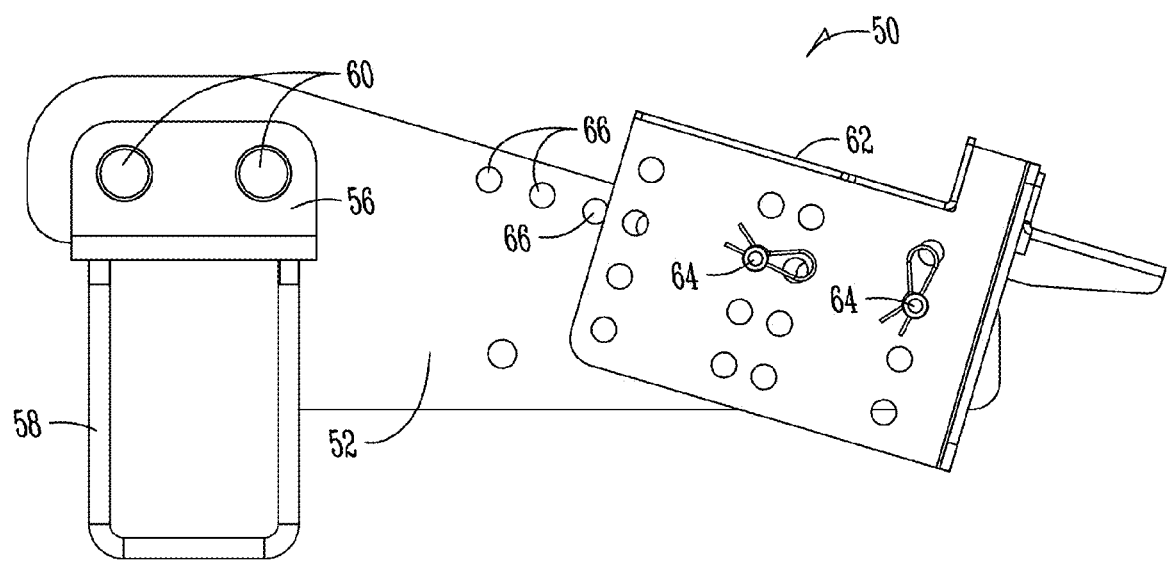
FIG. 14 is a side elevation view of the second saddle embodiment.
Figure 15:
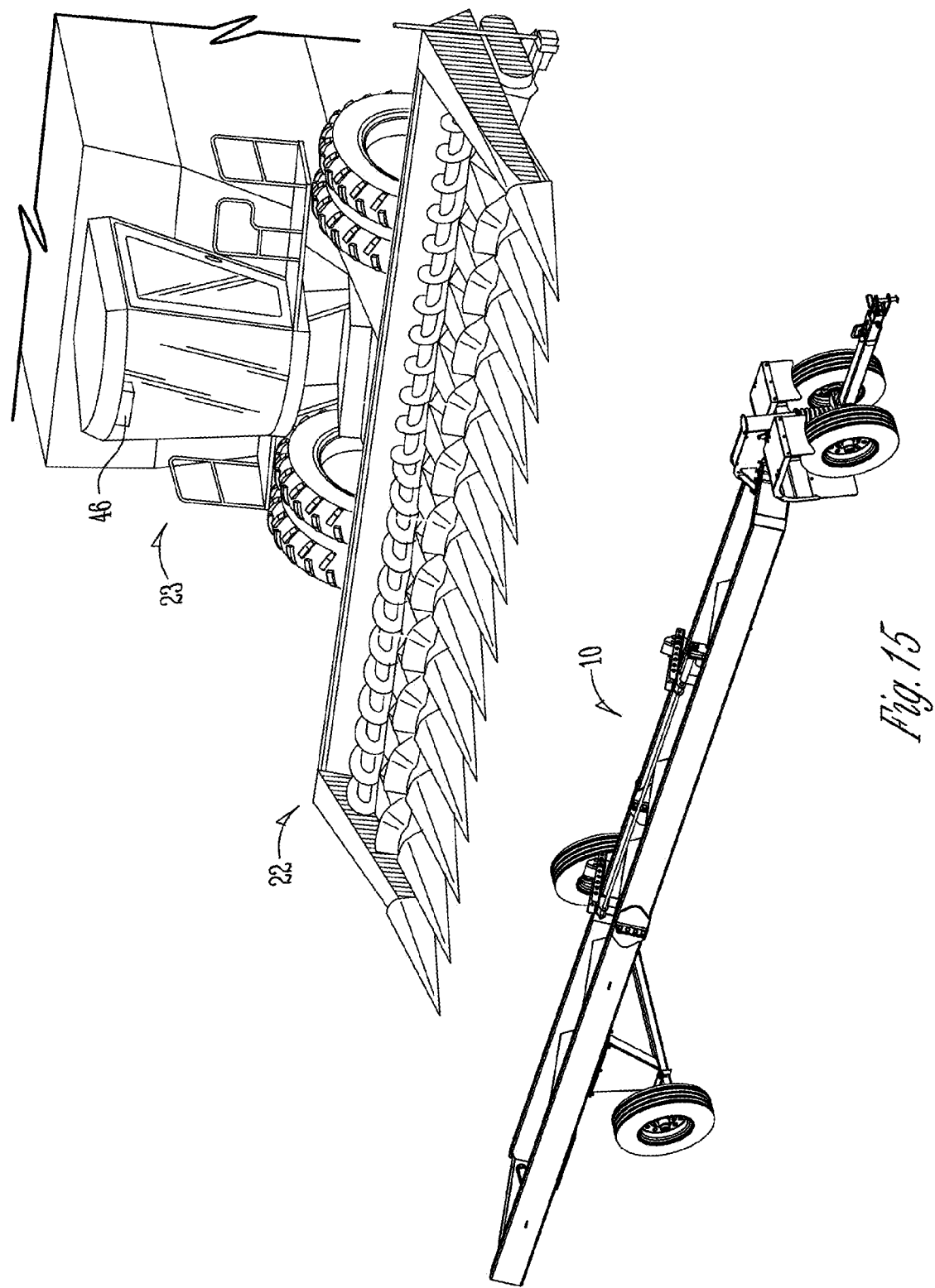
FIG. 15 is a schematic drawing showing a combine with a harvesting head positioned adjacent a head trailer, with a remote control device in the combine cab.

The saddle assembly 50 also includes a bracket 56 for each saddle 52. The bracket 56 is mounted on the trailer frame 12 using U bolts 58, or any other convenient fastener. Alternatively, the brackets 56 can be welded onto the frame 12. Each bracket 56 includes a pair of guide rods or bars 60 extending longitudinally relative to the trailer frame 12. Each saddle 52 is mounted on the guide rods 60, as best seen in FIG. 10, for sliding movement along the rods 60.

Each saddle 52 also include a stop member 62 which can be adjustably mounted on the saddle 52 via one or more pins 64 extending through aligned holes in the stop member and one set of holes 66 in the saddle 52.

An actuator 68, similar to the actuator 42, is mounted to the trailer frame 12 with an extendible and retractable end 70 attached or connected to one of the saddles 52. For a linear actuator, an electric motor 72 controls extension and retraction of the end 70 of the actuator 68. For a hydraulic or pneumatic actuator, a pump controls fluid flow to and from the cylinder to extend or retract the arm to push or pull the rod 54 for moving the saddles 52. When the motor 72 or the pump is turned on, the saddles 52, interconnected by the rod 54, will move in unison forwardly and rearwardly along the guide rods 60 to a desired position. When the motor 72 is turned off, the saddles 52 will remain in the selected position.

When it is desired to remove the head 22 from the combine 23 for transport down a road or other relatively narrow path or passage, the combine driver can approach the trailer 10 from one lateral side and raise the head 22 to a position above the frame 12. The driver, or another person, can then use the remote controller 46 to adjust the position of the saddles 24 or 52 forwardly or rearwardly on the trailer frame so as to be positioned directly beneath the heels of the head. Since the spacing between the saddles 24 or between the saddles 52 is preset to match the head heels, an operator can quickly and easily move the saddles by actuating the actuators 42, 68 to accommodate misalignment between the head or heels and the saddles. Then, the head 22 can be lowered onto the saddles 24 or 52 and detached from the combine 23 for transport.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A trailer for transporting an agricultural harvesting head, comprising:
    a wheeled frame;
    a pair of saddles configured to carry the head and adjustably mounted to the frame
    the saddles being coupled for movement in unison along the frame;
    an elongated rod extending between the saddles to connect the saddles together; and
    the rod having telescoping sections to allow adjustable spacing between the saddles.

2. The trailer of claim 1 further comprising an actuator connected to one of the saddles to move the saddles simultaneously along the frame.

3. The trailer of claim 2 further comprising a remote control for operating the actuator.

4. The trailer of claim 1 wherein each saddle includes a stop member to limit movement of the head in the saddle.

5. A saddle assembly for a combine head trailer having a wheeled frame, comprising
    first and second saddles adapted to be mounted in spaced relation to the trailer to support a combine head;
    a rod extending between the first and second saddles;
    an actuator connected to the first saddle to move the saddles simultaneously along the trailer before the combine head is received in the saddles; and
    each saddle including a pair of legs straddling the frame and an upper cradle on top of the frame to receive the head.

6. The trailer of claim 5 wherein each saddle includes a stop member to limit movement of the head in the saddle.

7. The trailer of claim 5 wherein the rod has telescoping sections for adjusting spacing between the saddles.

8. The trailer of claim 5 further comprising a remote control for operating the actuator.

9. A trailer for transporting an agricultural harvesting head, comprising:
    a wheeled frame;
    a pair of saddles adjustably mounted to the frame;
    the saddles being coupled for movement in unison along the frame; and
    each saddle including a pair of legs straddling the frame and an upper cradle on top of the frame to receive the head.

10. The trailer of claim 9 further comprising an actuator connected to one of the saddles to move the saddles simultaneously along the frame.

11. The trailer of claim 9 further comprising a remote control for operating the actuator.

12. The trailer of claim 9 wherein each saddle includes a stop member to limit movement of the head in the saddle.

13. A trailer for transporting an agricultural harvesting head, comprising:
    a wheeled frame;

a pair of saddles adjustably mounted to the frame;
the saddles being coupled for movement in unison along the frame;
a bracket fixed on the frame and the saddle being slidably mounted on the bracket; and
the bracket having at least one guide bar extending longitudinally relevant to the frame, and the saddle being moveable along the bar.

14. The trailer of claim 13 further comprising an actuator connected to one of the saddles to move the saddles simultaneously along the frame.

15. The trailer of claim 13 further comprising a remote control for operating the actuator.

16. The trailer of claim 13 wherein each saddle includes a stop member to limit movement of the head in the saddle.

17. A saddle assembly for a combine head trailer having a wheeled frame, comprising first and second saddles adapted to be mounted in spaced relation to the trailer to support a combine head;
a rod extending between the first and second saddles;
an actuator connected to the first saddle to move the saddles simultaneously along the trailer before the combine head is received in the saddles;
a bracket fixed on the frame and the saddle being slidably mounted on the bracket; and
the bracket having at least one guide bar extending longitudinally relevant to the frame, and the saddle being moveable along the bar.

18. The trailer of claim 17 wherein each saddle includes a stop member to limit movement of the head in the saddle.

19. The trailer of claim 17 wherein the rod has telescoping sections for adjusting spacing between the saddles.

20. The trailer of claim 17 further comprising a remote control for operating the actuator.

* * * * *